United States Patent

Breikss

[15] 3,702,382

[45] Nov. 7, 1972

[54] FREQUENCY DIVIDER

[72] Inventor: Ivars P. Breikss, Littleton, Colo.

[73] Assignee: Honeywell, Inc., Minneapolis, Minn.

[22] Filed: Aug. 11, 1970

[21] Appl. No.: 62,870

[52] U.S. Cl..........179/100.2 R, 307/220 R, 318/314, 340/174.1 R

[51] Int. Cl.......G11b 19/26, H02p 5/34, H03k 23/00

[58] Field of Search.........340/174.1 R; 179/100.2 R; 307/220 R, 221 R, 225 R; 318/314

[56] References Cited

UNITED STATES PATENTS

| | | | |
|---|---|---|---|
| 3,228,017 | 1/1966 | Owen | 340/174.1 R |
| 3,400,317 | 9/1968 | Thomas | 318/314 |
| 3,151,507 | 10/1964 | Canova | 318/314 |
| 3,548,203 | 12/1970 | Basse | 307/225 R |
| 3,420,990 | 1/1969 | Andrea | 307/220 R |

OTHER PUBLICATIONS

L. Brock, Designing with MSI, Vol. I, Signetics Corp., Feb. 1970, pp. 2-4, 2-5.

*Primary Examiner*—Howard W. Britton
*Attorney*—Arthur H. Swanson, Lockwood D. Burton and Mitchell J. Halista

[57] ABSTRACT

A recording and reproducing apparatus for frequency modulation recording of an input data signal wherein the recording carrier frequency and the speed of driving a recording medium are concurrently selected in a digitally presettable sequence wherein the members of the sequence may be related to each other by any integral number. Similarly, the reproducing of a recorded FM signal is effected by an apparatus using the selected recording medium drive speed and a frequency discriminator digitally adaptable to the preset recording carrier frequency.

10 Claims, 3 Drawing Figures

INVENTOR.
IVARS P. BREIKSS

BY Mitchell J. Halista
ATTORNEY.

INVENTOR.
IVARS P. BREIKSS

BY *Mitchell J. Halista*

ATTORNEY

INVENTOR.
IVARS P. BREIKSS

BY Mitchell J. Halista
ATTORNEY.

FREQUENCY DIVIDER

The present invention relates to electrical signal recording and reproducing apparatus, and, more particularly, to an FM recording and reproducing apparatus having a digitally actuatable variable frequency divider.

BACKGROUND OF THE INVENTION

In the design of systems relating to digitally actuated signal manipulating apparatus, there is frequently a need for a means which will reliably divide a basic frequency into any of a number of submultiples. One instance of such apparatus is a digitally actuated frequency modulated magnetic recording and reproducing system. An example of such a system is shown and described in some detail in "Electronics" for Jan. 8, 1968, beginning at Page 93. Features of the system there shown and described are, also, shown, described and claimed in U.S. Pat. No 3,228,017 by J. R. Owen and in U.S. Pat No. 3,539,926, by the present inventor and assigned to the same assignee as the present application.

It is a feature of standard magnetic recorders, including those described in the aforementioned references, to provide means for advancing the record medium, i.e., a magnetic recording tape, at any one of a number of predetermined tape speeds. In order to optimize the storage of data on the record medium and the recovery of data therefrom, the center, or carrier, frequency of a frequency modulation recording system is adjusted in the same direction as and in an amount proportional to the selected recording tape speed relative to the predetermined basic center frequency corresponding to a basic tape speed. In such a system an analog signal, in the form of a variable voltage, is passed through an input amplifier and, then, applied as control signal to a voltage controlled oscillator. The output of the oscillator is therefore, an oscillatory signal which varies in frequency around a center frequency by an amount and in a direction proportional to the magnitude and polarity of the input analog signal, respectively. That frequency modulated, or FM, signal is then passed through a frequency dividing counter which includes a plurality of selectively gated output circuits, each corresponding to a related tape speed control signal. The counter and the output circuits there shown are arranged in a binary series to accommodate the predetermined variations in tape speed which, also, bear a binary relation to each other. The selectively divided frequency modulated signal from a selected one of the output circuits is applied through a suitable driver amplifier to a recording head whereby the FM signals are recorded on the tape.

Similarly, in the signal reproducing system, the recorded signals are detected by a suitable reproducing head and, after suitable signal conditioning, are applied as input signals to a digitally controlled pulse generator. That digital pulse generator, also, includes a binary counting chain controlled by gating means which gates are selectively operable in response to control signals representative of a selected playback tape speed corresponding to the recording tape speed. Again, the counting arrangement produces a plurality of output signals which bear a binary series relationship with respect to each other. The output signals produced in accordance therewith are amplified in a buffer amplifier and, then, passed through a selected one of a plurality of filters designed to remove the center frequency, thereby producing an analog output signal representative of the originally recorded analog data.

In many of the recording systems heretofore provided, the selection of tape speeds do, indeed, constitute a series which bear a binary relationship to each other. For example, a popular combination of selectable table speeds include speeds of 120 inches per second, 60 inches, 30 inches, 15 inches 7.5 inches, 3.75 inches, and 1.875 inches per second. The systems set forth in the aforementioned references provide an excellent recording and reproducing control system, however, the apparatus there presented is restricted to that binary relationship. On the other hand, it has been found desirable to provide a variable tape speed control system for magnetic recorders and reproducers wherein the selectable tape speeds bear other than a binary sequence relationship. For example, it may be desirable to provide a plurality of selectable tape speeds wherein the successive speed change increments follow a 1–3–10 sequence of relative tape speed levels. In still other systems, it may be desirable to provide selectable tape speeds which follow a 1–2–5 sequence. These and other non-binary tape speed sequence combinations are not available in the system hereinbefore described.

It is, accordingly, an object of the present invention to provide an improved digitally actuated variable frequency divider which obviates the limitations of previously available apparatus.

It is another object of the present invention to provide an improved digitally actuated variable frequency divider wherein a plurality of resultant output frequencies are made available which may follow any predetermined integral number sequence series with respect to each other.

A further object of the present invention is to provide an improved FM recording and reproducing system wherein correlated tape speeds and FM carrier frequencies are selectable in any integral number sequence.

SUMMARY OF THE INVENTION

In accomplishing these and other objects there has been provided, in accordance with the present invention, an improved frequency divider which includes a binary counter responsive to input signals for the sequential activation of the several stages of the counter. An output connection from each stage of the counter is provided to the respective inputs of a logic gate. The logic gate is arranged to pass a signal only when an appropriate input signal is concurrently applied to all of its several input terminals. Selection is accomplished by control of the counting sequence of the counter by auxiliary input means to each stage of the counter. Control signals applied to the auxiliary inputs of the counter are arranged in accordance with a binary-coded-decimal, i.e., BCD, system. The control signals thus applied inject a preset condition in selected ones of the counter stages thereby changing the count rate by the amount represented, on a binary-coded-decimal scale, by the injected signals. Since any integral number, within the range of the sum of the selected number of binary digits, can be represented by the injected control signals by proper selection of the counter stages to which the injected signals will be applied, a multiple choice of output signals may be obtained wherein the output signals follow any chosen series ratio relationship.

BRIEF DESCRIPTION OF THE DRAWINGS

A better understanding of the present invention may be had from the following detailed description when read in connection with the accompanying drawings, in which.

DETAILED DESCRIPTION

Figure 1:
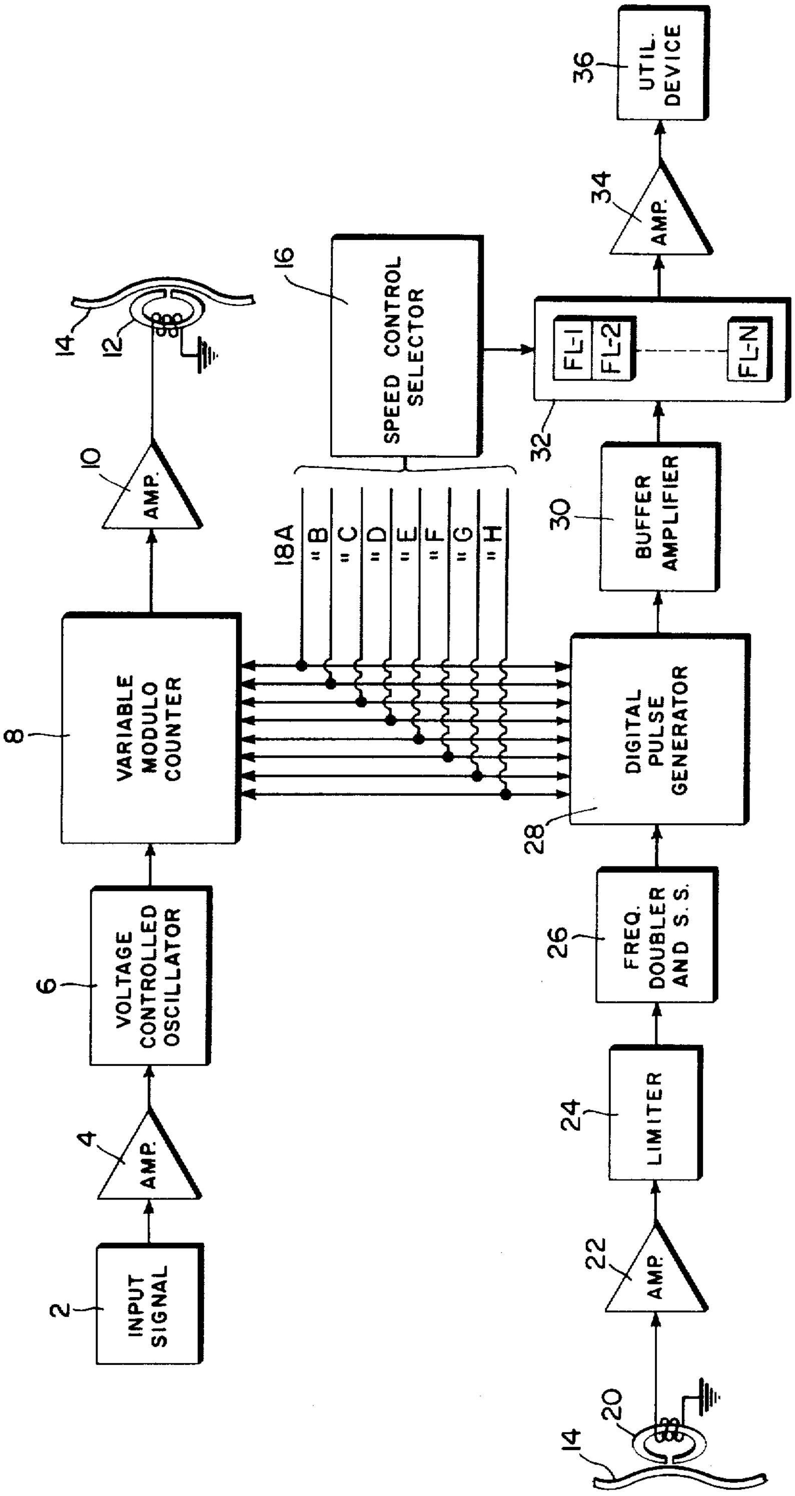
FIG. 1 is a schematic block diagram of a data recording and reproducing system embodying the present invention.

Referring now to the drawings in more detail, there is shown in FIG. 1 an FM recording-reproducing system which includes an input signal source 2 in an FM recording portion of the system. The signal provided by the source 2 may be an analog representation of the data to be recorded. This analog signal is passed through a signal conditioning amplifier 4 which establishes a proper signal level for the system. The amplified signal is, then, applied as a modulation control signal to a voltage controlled oscillator, VCO, 6. The voltage controlled oscillator may be of conventional construction and arranged to oscillate, in the absence of a modulation control signal, at a predetermined frequency which may be considered as the center frequency of the FM recording sub-system. The modulation control signal from the amplifier 4 causes the frequency of oscillation of the VCO 6 to vary about the aforesaid center frequency by an amount which is proportional to the magnitude, e.g., amplitude, of the modulation control signal. Additionally, the direction of the frequency variation with respect to the center frequency is dependent upon the polarity of the modulation control signal. Accordingly, the output signal from the oscillator 6 is a frequency modulation, i.e., FM, signal representative of the input signal from the source 2.

The FM signal from the oscillator 6 is applied as input signal to a variable modulo counter 8. The counter 8 is described in more detail hereinafter. However, it may be here stated that the counter 8 converts the FM signals into a series of square waves. External modulo control signals are applied to the counter 8, as described hereinafter, to control the counting sequence of the counter 8 in accordance with a preselected speed of a recording tape. Thus, the counter 8 converts the incoming signals into square waves having a duration as determined by the frequency of the output signal from the VCO 6 and the length of the counting sequence as preset by the external modulo control signals. In other words, a frequency deviation above the center frequency provides more input signals to the counter 8 during a given period of time and vice versa. On the other hand, the number of input signals needed by the counter 8 to provide a single output is preset by the modulo control signals. Thus, the counter 8 subdivides the frequency of the incoming signals while providing an FM output signal duplicating the frequency modulation of the input signals. The output signal from the variable modulo counter 8 is applied as an input signal to a head driver amplifier 10 which, in turn, energizes a magnetic recording head 12 whereby the signals are recorded on a magnetic record member, e.g., tape 14.

A tape speed control selector 16 not only provides means for controlling the rate of advance of the magnetic record member 14, but, also, provides a set of control signals uniquely identifying, or being correlated with, each individually selected tape speed, or advance, rate. In accordance with the present invention, these tape speed identifying signals are applied to selected ones of the output leads 18A through H from the selector 16 as will be discussed in more detail hereinafter. These tape speed identifying signals are applied as modulo control signals to control the count operation of the counter 8.

To reproduce the magnetically recorded signals, the magnetic tape 14 is driven, at a speed determined by the tape speed control selector 16, past a magnetic reproducing head 20. The FM playback signals thereby produced are applied to a signal conditioning amplifier 22. The amplifier 22 increases the amplitude of the reproduced FM signals to a usable level, and the amplified signals are, then, applied to a limiter 24 for conversion into a series of substantially square waves. The frequency of the square waves is doubled in a frequency doubler and single-shot circuit 26 and the square waves are converted into pulses, or spikes, marking the cycles of the square waves. The resulting pulse signals are applied as input control signals to a digital pulse generator 28. As will be described in more detail hereinafter, the digital pulse generator 28 operates in response to the aforesaid input control signals and the speed selector signals applied thereto along leads 18A through H to produce a series of square wave pulses. These pulses are frequency modulated in accordance with the frequency of the FM input control signals. The pulse width of each square wave is determined by the aforesaid speed selector signals and is, consequently, correlated to the recorded signals. These pulse signals are amplified in a buffer amplifier 30 to a predetermined desired level, and then passed through a filter network 32, having filters FL-1 to FL-N. The filter network 32 is arranged to remove the center, or carrier, frequency of the applied FM signals. As in the hereinbefore referenced prior art systems, a plurality of filters FL-1 to FL-N are provided in the filter network 32 which filters are correlated and selected simultaneously with the tape speed control selection by the speed selector 16. The output of the filter network 32 is an analog signal corresponding to the original input signal applied from the input source 2. This analog signal may be amplified in an output, or power, amplifier 34 and applied as input signal to an ultimate utilization device 36.

Figure 2:
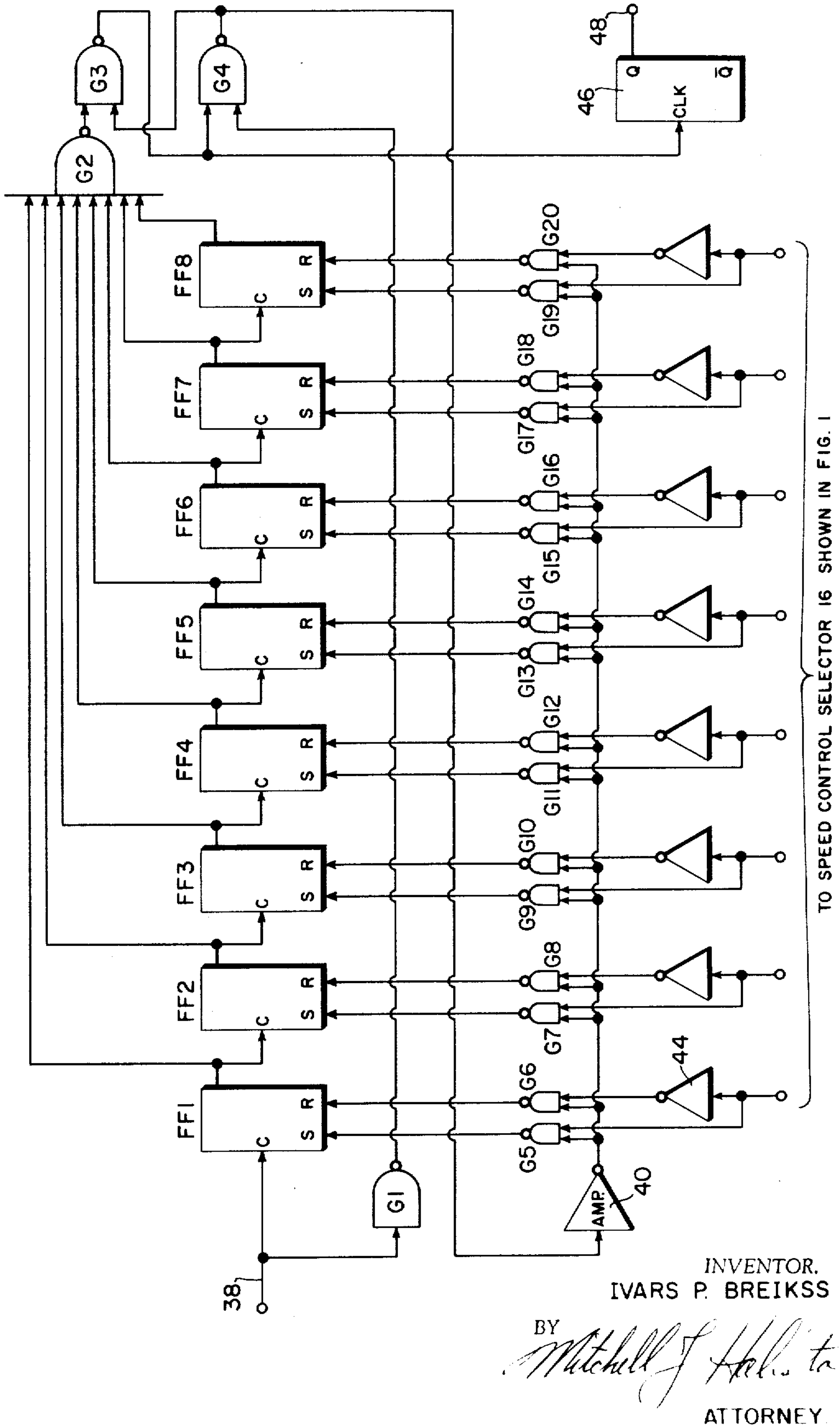
FIG. 2 is a schematic logic diagram pulse generator embodying the present invention.

In FIG. 2 there is shown, in schematic logic diagram, the details of a variable modulo counter suitable for use as the counter 8 in FIG. 1. In the following description, conventional digital logic terminology will be used including reference to a logical "one" and logical "zero." In an actual system constructed in accordance with the present invention, a logical "one" was established at approximately +4 volts while a logical "zero" was established at approximately zero volts.

The output signals from the VCO 6 shown in FIG. 1, which are substantially square wave signals, are applied to the input lead 38 of the variable modulo counter 8. The counter 8 includes a plurality of sequentially connected flip-flop stages, eight of such stages being illustrated as FF1 to FF8, with interconnections between output and clock terminals to produce a well-known sequential counting operation. The actual number of stages used in any given system would, of course, be determined by the maximum count desired. The signal appearing on lead 38 is also applied as input signal to an inverting gate G1. An output connection from the same side of each of the eight flip-flop stages FF1 to FF8 is made to the input terminals of an eight input NAND gate G2. The output of the gate G2 is connected to one of the input terminals of a two input NAND gate G3 which is cross-connected with a similar NAND gate G4. That is, the output of the gate G3 is connected to one of the input terminals of gate G4 and the output terminal of the gate G4 is connected to the other of the input terminals of the Gate G3. The other of the input terminals of the gate G4 is connected to the output of the previously mentioned gate G1. The output of the gate G4 is also connected through an inverting amplifier 40 to one of the input terminals of each of the gates of a plurality of pairs of preset control gates, shown as NAND gates G5 to G20. A connection is made to a second input terminal on each of the gates of the pairs of NAND gates G5 to G20 whereby signals derived from the speed control selector 16, by way of leads 18A through H, are applied thereto. Specifically, one of each pair of gates is supplied directly with a respective signal from the selector 16 while the other gate of each pair is supplied with an inverted form thereof. For example, a pair of control gates includes a "set" NAND gate G5 and a "reset" NAND gate G6. The connection between the "set" gate G5 and the corresponding one of speed control selector leads 18A to 18H is a direct connection while the connection between the "reset" gates G6 and the aforesaid one of the speed control selector leads 18A to 18H is through an inverting amplifier 44.

The outputs of each of the control NAND gates G5 to G20 are connected to corresponding "set" and "reset" inputs of the flip-flops FF1 to FF8. For example, the "set" gate G5 is connected to the "set" input of first flip-flop FF1 while the "reset" gate G6, paired with gate G5, is connected to the "reset" input of the first flip-flop FF1. Assume a logical "0" is applied to the control line connected to inverting amplifier 44 and to gate G5, e.g., along control line 18A. This logic input is inverted to a logical "1" by the amplifier 44 before being applied to gate G6. The logical "1" obtained from the inverting amplifier 40 (representative of an inverted input logical "0") is effective, in combination with the aforesaid output from the amplifier 44, to produce a logical "0" at the output of gate G6. Conversely, the logical "0" from the direction connection of line 18A to gate G5 is combined with the logical 1 amplifier 40 to produce a logical "1" at the output of gate G5. This logical "1" is applied to the "set" input of the first flip-flop FF1 to set that flip-flop to a logical "1" state in combination with the aforesaid logical "0" at the output gate G6. Similarly, the binary inputs of lines 18B to 18H are concurrently entered into the other counter flip-flops FF2 to FF8. Finally, the output of NAND gate G3, in addition to being connected to one of the input terminals of the NAND gate G4, is, also, connected to the clock, or toggle, input of an output flip-flop 46. The "Q" output of the flip-flop 46 is connected to a counter output terminal 48.

For the purposes of the following discussion, assume that all of the flip-flop stages FF1 to FF8 of the counter are initially in a "reset" or logical "0" output condition. Signals supplied to the counter from the VCO 6 by way of the lead 38 causes the counter to follow its counting sequence which ultimately produces a logical "1" on the output leads from each of the flip-flop stages. That is, after a count of 256 pulses from the VCO 6, a logical "1" will appear on the output lead of each of the stages. When all these output lines are carrying the "1" signal, all of the inputs to the NAND gate G2 are the proper level to trigger the gate G2 and its output, in response thereto, becomes a logical "0." The crossed coupled gated G3 and G4 effectively constitute a binary stage. The logical "0" appearing at the output of the gate G2 and applied as input signal to the gate G3 causes the resultant binary to assume a logical "1" state. In other words, the output of the gate G3 is a "1" and the output of the gate G4 is a logical "0."

The logical "0" appearing at the output of the gate G4 is applied through the inverting amplifier 40 to one of the inputs of each of preset control gates G5 to G20. Under that preset condition, the level control signals from the speed control selector 16 appearing on the leads 18A through H, which are connected to the other inputs of the gates G5 to G20, would be gated into and set the respective ones of the counter flip-flops FF1 through 8. Thus, a logical "0" appearing on any of the leads 18A through H would cause the associated flip-flop FF1 through 8 to assume a logical "1" condition as described above and vice versa. It will be appreciated that a logical "0" could be applied simultaneously to more than one of the leads 18A through H. Since the several counter flip-flops FF1 through FF8 represent successive increments on a binary scale the preset of a flip-flop to a logical "1" in the counter will shorten the counting sequence of the input pulses, i.e., the maximum count will achieve in a shorter time by a factor represented by the binary notation of the preset stage. If the preset "1" condition occurs on more than one of the flip-flops FF1 through 8, then the count of the input pulses will be shortened by an amount equal to the sum of those binary values represented by the several preset stages. It may be considered that the flip-flop FF1 through FF8 represent, respectively, successive division ratios $2^0$ to $2^7$. If, in the examplary environment there are provisions for selecting any of eight different tape speeds through operation of a speed control selector and these eight different speeds are interrelated on a binary sequence scale, as in the prior art arrangements, the speed control selector would, also, be arranged to provide a logical "zero" on a single one of the leads 18A through H. The following table clearly lists in tabular form the resulting binary counting sequence and respective tape speeds:

TABLE 1: BINARY SEQUENCE

| Control Inputs A | B | C | D | E | F | G | H | Pulses Counted | Output Pulse Length | Tape Speed (IPS) |
|---|---|---|---|---|---|---|---|---|---|---|
| 0 | 1 | 1 | 1 | 1 | 1 | 1 | 1 | 2 | A | 120 |
| 1 | 0 | 1 | 1 | 1 | 1 | 1 | 1 | 4 | 2A | 60 |
| 1 | 1 | 0 | 1 | 1 | 1 | 1 | 1 | 8 | 4A | 30 |
| 1 | 1 | 1 | 0 | 1 | 1 | 1 | 1 | 16 | 8A | 15 |
| 1 | 1 | 1 | 1 | 0 | 1 | 1 | 1 | 32 | 16A | 7.5 |
| 1 | 1 | 1 | 1 | 1 | 0 | 1 | 1 | 64 | 32A | 3.75 |
| 1 | 1 | 1 | 1 | 1 | 1 | 0 | 1 | 128 | 64A | 1.875 |
| 1 | 1 | 1 | 1 | 1 | 1 | 1 | 0 | 256 | 128A | 0.9375 |

On the other hand, if it is desired to produce other novel counting sequences, then corresponding ones of preset flip-flops FF1 to FF8 produced by logical "0's" on several of the leads 18A to H may be used. The following table shows the resulting counting sequence for two different examples:

TABLE 2

1-3-10 Sequence

| Control Inputs A | B | C | D | E | F | G | H | Pulses Counted | Output Pulse Length | Tape Speed (IPS) |
|---|---|---|---|---|---|---|---|---|---|---|
| 1 | 0 | 1 | 1 | 1 | 1 | 1 | 1 | 2 | A | 120 |
| 1 | 0 | 0 | 1 | 1 | 1 | 1 | 1 | 6 | 3A | 40 |
| 1 | 1 | 0 | 1 | 0 | 1 | 1 | 1 | 20 | 10A | 12 |
| 1 | 1 | 0 | 0 | 0 | 0 | 1 | 1 | 60 | 30A | 4 |
| 1 | 1 | 1 | 0 | 1 | 1 | 0 | 0 | 200 | 100A | 1.2 |

1-2-5 Sequence

| A | B | C | D | E | F | G | H | Pulses Counted | Output Pulse Length | Tape Speed (IPS) |
|---|---|---|---|---|---|---|---|---|---|---|
| 1 | 0 | 1 | 1 | 1 | 1 | 1 | 1 | 2 | A | 120 |
| 1 | 1 | 0 | 1 | 1 | 1 | 1 | 1 | 4 | 2A | 60 |
| 1 | 0 | 1 | 0 | 1 | 1 | 1 | 1 | 10 | 5A | 24 |
| 1 | 1 | 0 | 1 | 0 | 1 | 1 | 1 | 20 | 10A | 12 |
| 1 | 1 | 1 | 0 | 1 | 0 | 1 | 1 | 40 | 20A | 6 |
| 1 | 1 | 0 | 1 | 1 | 0 | 0 | 1 | 100 | 50A | 2.4 |

The speed control selector 16 may be any suitable prior art circuit capable of applying logical "0" and "1" combinations to the control leads 18A to H. Thus, electro-mechanical as well as electronic switches may be used to effect this function. When the maximum count of the counter stages FF1 to FF8 is reached, in whatever sequence was preset by the control input signals applied to the gates G5 to G20, the combined "1" outputs of the counter stages are concurrently applied to the NAND gate G2. The logical "1" state of the inputs to gate G2 is effective to produce a gate output of a logical "0." This "0" output is applied to NAND gate G3 to produce a state in the binary formed by the cross-coupled gates G3 and G4 wherein the output of G3 is a logical "1" and the output of G4 is a logical "0." The "0" output of G4 is applied to one input of each of the gates G5 to G20 where, in combination with the signals appearing on the control leads 18A to 18H, it is effective to preset the counter flip-flops FF1 to FF8.

The next clock pulse from the VCO 6 applied to terminal 38 is coupled by NAND gate G1 to the binary formed by G3 and G4 and is effective to produce a logical "0" state thereof, i.e., G3 is in a logical "0" state and G4 is in a logical "1" state, to start a new counting cycle. The output of gate G3 is, also, applied to the clock input of the flip-flop 46. The number of changes of state of gate G3 is, thus, divided by a factor of two by the flip-flop 46, and a corresponding output from the flip-flop 46 on terminal Q is applied to the output terminal 48. This output is a symmetrical square wave for use by the head driver electronics shown as amplifier 10 in FIG. 1, with the duration of the square wave having been determined by the input signal control of the VCO 6 and by the speed control selector 16 operation of the variable modulo counter 8 as described above.

Figure 3:
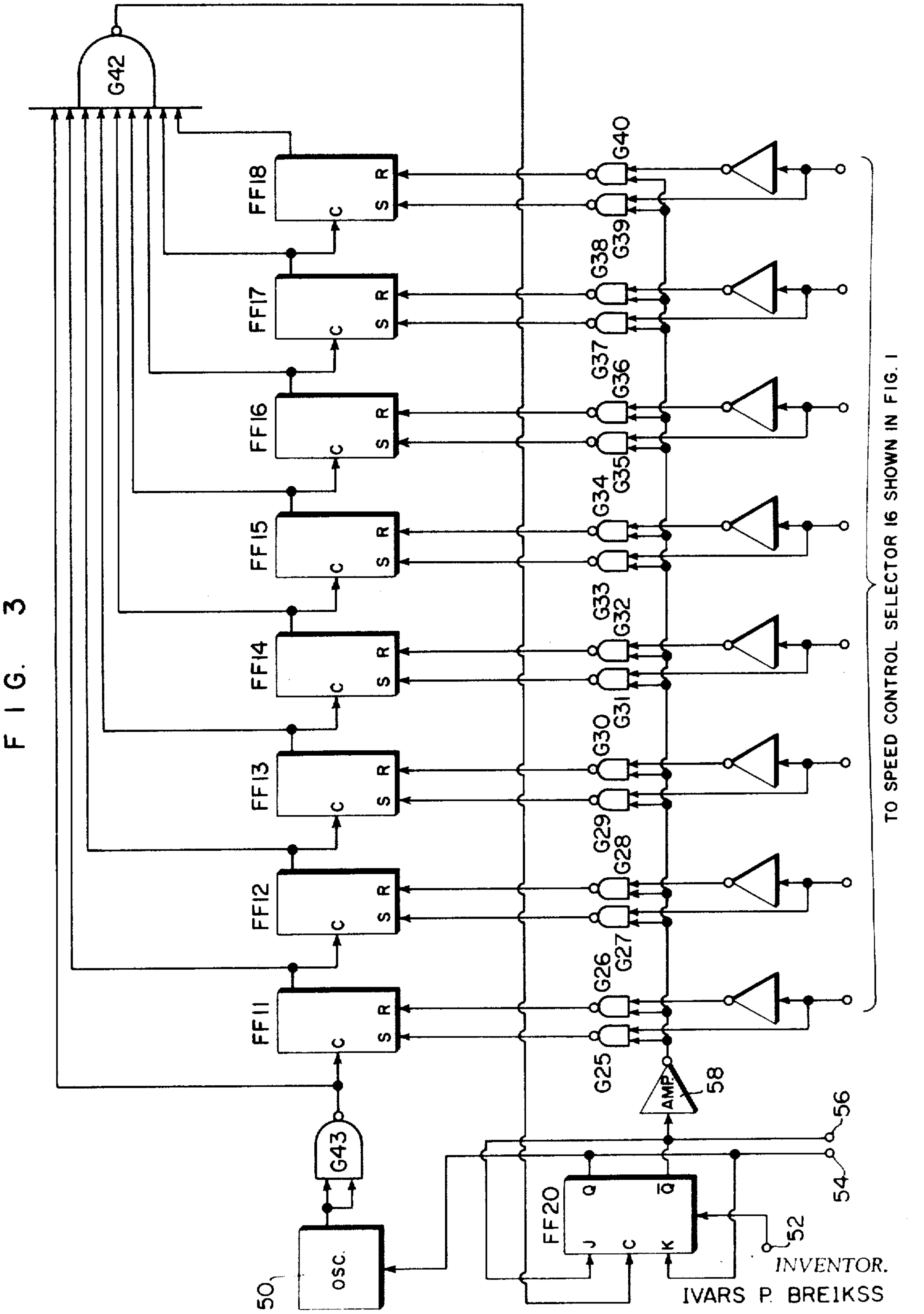
FIG. 3 is a schematic logic diagram of a variable modulo counter embodying the present invention.

In FIG. 3 there is shown a logic diagram of a circuit suitable for use as the digital pulse generator 28 of FIG. 1. As is readily apparent from FIG. 3, a counting and gating arrangement similar to that shown and described above with respect to FIG. 2 is, also, used in the digital pulse generator shown in FIG. 3. Specifically, a counter chain including interconnected flip-flops FF11-FF18 corresponds to the flip-flops FF1 to FF8 shown in FIG. 2. Similarly, control gates G25 to G40 correspond to the control gates G5 to G20 shown in FIG. 2. Further, NAND gate G42 corresponds to NAND gate G2. Accordingly, a detailed description of the operation of these circuits and the effect of the speed control selector signals appearing of lines 18A to 18H will not be presented here inasmuch as this operation is substantially similar to that described above for the variable modulo counter of FIG. 2. However it should be noted that the gate G42 is a nine-input NAND gate rather than the eight-input NAND gate shown in FIG. 2. This extra input is connected to the output of gate G43 which is supplied with input signals from a fixed oscillator 50. The frequency of the oscillator 50 is set higher than the center frequency of the VCO 6 to insure that the counter chain of flip-flops FF11 to FF18 will count a minimum of two pulses at the highest selected tape speed in any counting sequence. Thus, the gate G42 requires an additional input of a clock pulse from the oscillator 50 as well as the logical "1" outputs from the flip-flops FF11 to FF18 before it changes its logical output state.

An output signal from the frequency doubler 26, shown in FIG. 1, is applied to the digital pulse generator 28 via an input terminal 52, shown in FIG. 3, which is connected to the "CD" (Clear Direct) input of a flip-flop FF20. The logical output of the gate G42 is connected to the clock input of flip-flop 20. The "Q" output of flip-flop 20 is connected as a trigger signal to start the oscillator 50. Additionally, this "Q" output is applied as an output signal to output terminal 54 and as an input signal to the "K" input of flip-flop 20. Similarly, the "$\bar{Q}$" output of flip-flop 20 is connected to a second output terminal 56, which is connected to the buffer 30 of FIG. 1, and as an input to the "J" input of flip-flop 20. Further, the "$\bar{Q}$" output of flip-flop 20 is applied through inverting amplifier 58 to trigger the gates G25 to G40 in a manner similar to that described above with respect the corresponding elements shown in FIG. 2.

The following discussion of the operation of the digital pulse generator circuit shown in FIG. 3 is based on the initial assumption that the flip-flops FF11-FF18 are in a logical "0" state which can be produced any suitable reset means (not shown). A pulse from the frequency doubler 26 representative of the start of a reproduced data signal detected by the head 20 is applied to terminal 52 to clear the flip-flop 20, i.e., the output Q is in a logical "0" state and the output $\overline{Q}$ is in a logical "1" state. This state of flip-flop 20 is effective to trigger the oscillator 50 into oscillation by means of the "Q" output applied thereto. Further, the logical "1" state on the $\overline{Q}$ output is inverted by the amplifier 58 and is supplied as a logical "0" to the gates G25 to G40 to effectively inactivate these gates. The output of the oscillator 50 is, now, applied through NAND gate G43 to the counter flip-flop FF11 to FF18. These counter flip-flops will advance to the maximum count, i.e., 256, in accordance with any preset condition thereof as described above with respect to FIG. 2. Upon reaching the maximum count, all of the flip-flops FF11 to FF18 will apply a logical "1" output to the NAND gate G42. The rising edge of the next pulse from oscillator 50 is, also, applied through the NAND gate G43, gate G42 and is effective to produce a logical "0" output from gate G42. The falling edge of this transition of gate G42 to a logical "0" is effective, when applied to the clock input of flip-flop FF20, to change the logical state of flip-flop FF20 to a logical "1." This state of flip-flop 20 produces a logical "1" output state on the Q output thereof which output state is effect to turn-off the oscillator 50. Additionally, the logical "0" output of the $\overline{Q}$ terminal of flip-flop 20 is applied through inverting amplifier 58 to the gates G25 to G40 to effect an entry of the preset control signals on lines 18A to 18H into the flip-flops FF11 to FF18 to initiate a new counting sequence.

The next input pulse to input terminal 52 representing the start of a subsequent cycle of the reproduced FM signal from the head 20 is effective to repeat the aforesaid sequence of operation starting with the preset state of flip-flops FF11 to FF18. The outputs on terminals 54 and 56 are complimentary outputs and may be utilized either as discussed above to reproduce the direct representation of the recorded analog signal by means of output terminals 54 or its complement by means of output terminal 56. The reproduced analog signal is correlated with the recorded analog signal by means of the novel variable modulo counter and digital pulse generator circuits described above both of which are concurrently controlled by the speed control selector 16. Thus, the pulse widths used in the recording of an input signal and the subsequent reproduction thereof are compatibility handled by the frequency modulation system of the present invention.

Thus, it may be seen that there has been presented in accordance with the present invention a novel recording and reproducing system having an improved variable frequency divider wherein output frequencies may follow any predetermined integral number sequence and wherein the recording and reproducing operations are correlated in accordance with a predetermined number sequence.

The embodiments of the invention in which an exclusive property or privilege is claimed are defined as follows:

1. A signal recording and reproducing system comprising an oscillator means operative to produce a frequency modulated recording signal with respect to a center frequency in response to variations in an input signal applied thereto, variable modulo counter means operative to subdivide said recording signal into a preselected one of a plurality of differing frequency ranges, each of said frequency ranges being capable of representing said input signal, switching means operative to control said counter means to select one of said frequency ranges, recording means responsive to an output of said counter means, reproducing means responsive to a signal recorded by said recording means, second oscillator means operating at a frequency having a predetermined relationship to said center frequency of said first mentioned oscillator means, and second counter means arranged to count output pulses from said second oscillator means, said switching means being arranged to control said second counter means concurrently with said first counter means to produce similar counting sequences therein.

2. A signal recording and reproducing system as set forth in claim 1 wherein said first-mentioned counter means and said second counter means each include a plurality of interconnected binary counter stages and a plurality of binary stage presetting gates associated with each of said binary counting stages, said switching means being arranged to enter predetermined count states into said counting stages by means of said preset gates at a predetermined point in a counting cycle.

3. A signal recording and reproducing system as set forth in claim 2 wherein said variable modulo counter means is operative to subdivide said recording signal by any positive integer represented by the sum of the binary weights of the preset counter stages.

4. A signal recording system comprising an oscillator means operative to produce a frequency modulated recording signal modulated with respect to a center frequency in response to variations in an input signal applied thereto, variable modulo counter means operative to subdivide said recording signal into a preselected one of a plurality of differing frequency ranges each of said frequency ranges being capable of representing said input signal, said counter means including a binary counter having a plurality of counting stages, and means for presetting said binary counter stages in a preselected coded pattern to affect a counting sequence, and switching means operative to control said means for presetting said counting stages to set said counting stages into said coded pattern whereby to select one of said frequency ranges.

5. A signal recording system as set forth in claim 4 wherein said counter means includes a plurality of interconnected binary counter stages and a plurality of binary stage presetting gates associated with each of said binary counting stages, said switching means being arranged to enter predetermined count states into said counting stages by means of said preset gates at a predetermined point in a counting cycle.

6. A signal recording system as set forth in claim 4 wherein said variable modulo counter means is operative to subdivide said recording signal by any positive integer represented by the sum of the binary weights of the preset counter stages.

7. A signal reproducing system for recorded signals comprising signal reproducing means responsive to a recorded signal, oscillator means operating at a frequency having a predetermined relationship to a center frequency of said reproduced frequency modulated signal, counter means arranged to count output pulses from said oscillator means, and switching means arranged to control said counter means to produce any one of a predetermined plurality of counting sequences.

8. A signal reproducing system for recorded signals as set forth in claim 7 wherein said counter means includes a plurality of interconnected binary counter stages and a plurality of binary stage presetting gates associated with each of said binary counting stages, said switching means being arranged to enter predetermined count states into said counting stages by means of said preset gates at a predetermined point in a counting cycle.

9. A signal reproducing system as set forth in claim 7 wherein said counter means is operative to subdivide said output pulses from said oscillator means by any positive integer represented by the sum of the binary weights of the preset counter stages.

10. A variable modulo counter comprising a plurality of flip-flop stages interconnected to form a binary counting chain, a summing gate means arranged to produce a binary output signal of one polarity in response to a similar output signal from all of said flip-flops, a plurality of control gates connected to each one of said flip-flons to apply presetting signals to said flip-flops, means for applying an output signal from said summing gate means concurrently to all of said control gate means and preset signal input terminals arranged to apply preset control signals to preselected ones said preset gate means and inverted preset control signals to the others of said gate means, said output signal from said first mentioned gate means being arranged to energize said control gates to allow binary signals of one plurality of be applied to set flip-flops.

* * * * *